(12) United States Patent
Gelso et al.

(10) Patent No.: US 12,715,433 B2
(45) Date of Patent: Aug. 25, 2026

(54) HANDLING A VEHICLE IN RISK OF A REAR-END COLLISION

(71) Applicant: VOLVO TRUCK CORPORATION, Gothenburg (SE)

(72) Inventors: Esteban Gelso, Västra Frölunda (SE); Maliheh Sadeghi Kati, Öjersjö (SE); Leo Laine, Gothenburg (SE)

(73) Assignee: VOLVO TRUCK CORPORATION, Gothenburg (SE)

(*) Notice: Subject to any disclaimer, the term of this patent is extended or adjusted under 35 U.S.C. 154(b) by 0 days.

(21) Appl. No.: 19/173,096

(22) Filed: Apr. 8, 2025

(65) Prior Publication Data

US 2025/0313196 A1 Oct. 9, 2025

(30) Foreign Application Priority Data

Apr. 9, 2024 (EP) .................................... 24169291

(51) Int. Cl.
*B60W 60/00* (2020.01)
*B60R 21/0134* (2006.01)
(Continued)

(52) U.S. Cl.
CPC ..... *B60W 30/0956* (2013.01); *B60R 21/0134* (2013.01); *B60W 30/09* (2013.01);
(Continued)

(58) Field of Classification Search
CPC ............. B60W 30/0956; B60W 30/09; B60W 2720/106; B60W 2720/125;
(Continued)

(56) References Cited

U.S. PATENT DOCUMENTS 6,343,810 B1 * 2/2002 Breed .................. B60R 21/233 280/730.2
2020/0148229 A1 * 5/2020 Meyer ...................... B60T 7/12
(Continued)

FOREIGN PATENT DOCUMENTS

| | | | |
|---|---|---|---|
| EP | 3022092 | A1 | 5/2016 |
| EP | 3933438 | A2 | 1/2022 |
| WO | 2015009216 | A1 | 1/2015 |

OTHER PUBLICATIONS

Extended European Search Report in corresponding European Application No. 24169291.2 dated Oct. 7, 2024 (8 pages).

*Primary Examiner* — Masud Ahmed
(74) *Attorney, Agent, or Firm* — Jeffri A. Kaminski; Venable LLP

(57) ABSTRACT

A computer system has processing circuitry to handle a first vehicle. The first vehicle is travelling in a longitudinal travel direction on a road. The processing circuitry is configured to obtain from a sensor, sensor data of a motion of a second vehicle travelling towards the first vehicle in the longitudinal travel direction, and based on the sensor data, estimate a risk of collision between the first vehicle and the second vehicle. When the estimated risk of collision is within a first predefined interval, the processing circuitry is configured to trigger a safety action to be performed by the first vehicle based on the motion of the second vehicle. The safety action includes adjusting a motion of the first vehicle and/or actuating airbags of the first vehicle.

15 Claims, 3 Drawing Sheets

(51) Int. Cl.
*B60W 30/09* (2012.01)
*B60W 30/095* (2012.01)

(52) U.S. Cl.
CPC . *B60W 2720/106* (2013.01); *B60W 2720/125* (2013.01); *B60W 2720/14* (2013.01); *B60W 2720/30* (2013.01)

(58) Field of Classification Search
CPC ......... B60W 2720/14; B60W 2720/30; B60W 30/0953; B60W 2300/14; B60W 2720/406; B60W 30/085; B60R 21/0134; B60Y 2200/142; B60Y 2200/147
See application file for complete search history.

(56) References Cited

U.S. PATENT DOCUMENTS

| | | | | |
|---|---|---|---|---|
| 2023/0024300 | A1* | 1/2023 | Gould | B60R 21/2165 |
| 2023/0026681 | A1* | 1/2023 | Fischer | B60R 21/2338 |
| 2023/0242105 | A1* | 8/2023 | Brendley | B60R 21/0134 701/45 |

* cited by examiner

HANDLING A VEHICLE IN RISK OF A REAR-END COLLISION

TECHNICAL FIELD

The disclosure relates generally to vehicle motion management. In particular aspects, the disclosure relates to handling a vehicle in risk of a rear-end collision. The disclosure can be applied to heavy-duty vehicles, such as trucks, buses, and construction equipment, among other vehicle types. Although the disclosure may be described with respect to a particular vehicle, the disclosure is not restricted to any particular vehicle.

BACKGROUND

Vehicle collisions where a striking vehicle collide into a rear-end of a victim vehicle when they both are driving along the same road in the same direction is dangerous and needs to be mitigated to improve traffic safety. A way to mitigate these dangers is to employ an Advanced Driver Assistance Systems (ADAS) in the striking vehicle, in particular a Collision Avoidance Systems (CAS) which is configured to warn the driver of the striking vehicle when it approaches the victim vehicle, or to automatically control the steering or braking of the striking vehicle such as to evade the collision with the rear of the victim vehicle.

However, collisions may still occur due to the striking vehicle not being able to evade in time. Hence, there is a strive to improve traffic safety with regards to rear-end collisions between vehicles.

SUMMARY

According to a first aspect of the disclosure, a computer system comprising processing circuitry configured to handle a first vehicle is provided. The first vehicle is travelling in a longitudinal travel direction on a road. The processing circuitry is configured to obtain from a set of sensors mounted on the first vehicle, sensor data indicative of a motion of a second vehicle travelling the road. The second vehicle is travelling towards the first vehicle in the longitudinal travel direction. In other words, the second vehicle is travelling towards a rear of the vehicle, and is travelling in the same travel direction as the first vehicle. Consequently, a collision may occur if the second vehicle travels faster along the longitudinal travel direction than the first vehicle.

The processing circuitry is configured to estimate a risk of collision between the first vehicle and the second vehicle based on the sensor data.

The processing circuitry is configured to, trigger a safety action to be performed by the first vehicle when the estimated risk of collision between the first vehicle and the second vehicle is within a first predefined interval. The safety action is triggered based on the motion of the second vehicle. The safety action comprises adjusting a motion of the first vehicle, and/or actuating one or more exterior airbags of the first vehicle.

The first aspect of the disclosure may seek to improve traffic safety with regards to rear-end collisions between vehicles. A technical benefit may include avoiding a collision between the first vehicle and the second vehicle, or mitigating effects thereof. This is achieved since the first vehicle triggers the safety action based on the motion of the second vehicle. This means that the first vehicle may adapt its motion to completely avoid or to reduce impact of a collision, and/or to reduce dangers of a collision by actuating the airbags causing forces applied to a driver or passenger of the second vehicle to be significantly reduced.

Optionally in some examples, including in at least one preferred example, adjusting the motion of the first vehicle comprises adjusting lateral and/or longitudinal speed and/or acceleration of the first vehicle.

A technical benefit may include avoiding a collision between the first vehicle and the second vehicle, or mitigating effects thereof. This is since the first vehicle may adjust its lateral and/or longitudinal speed and/or acceleration to avoid the collision, or at least ensure that the collision impact is reduced thereby improving safety of passengers of the vehicles.

Optionally in some examples, including in at least one preferred example, adjusting the motion of the first vehicle comprises triggering a yaw moment to be applied to the first vehicle.

A technical benefit may include avoiding a collision between the first vehicle and the second vehicle, or mitigating effects thereof. This is since the yaw moment may cause the first vehicle to turn away such that the collision is avoided, or at least ensuring that the collision impact is reduced.

Optionally in some examples, including in at least one preferred example, triggering the yaw moment to be applied to the first vehicle comprises triggering different torque to be applied to different wheels of the first vehicle.

A technical benefit may include avoiding a collision between the first vehicle and the second vehicle, or mitigating effects thereof. This is since the yaw moment and how the first vehicle is turned can be accurately controlled such that the collision is avoided, or at least ensuring that the collision impact is reduced. Controlling the torque in this manner, also referred to as torque vectoring, may also be performed without the need for turning the steering wheel, and may also only involve a subset of wheels such that the yaw moment is accurately set such that the first vehicle avoids the collision with the second vehicle.

Optionally in some examples, including in at least one preferred example, when the first vehicle comprises one or more towed vehicle units, triggering the yaw moment to be applied to the first vehicle comprises triggering a yaw moment to be applied to a rearmost vehicle unit of the one or more towed vehicle units.

A technical benefit may include avoiding a collision between the first vehicle and the second vehicle, or mitigating effects thereof. This is since the rearmost vehicle unit is the most likely vehicle unit to be impacted by a collision with the second vehicle, and due to triggering the yaw moment on the rearmost vehicle unit, said vehicle unit can avoid impact with the second vehicle, or at least reduce an impact of the collision.

Optionally in some examples, including in at least one preferred example, when the first vehicle comprises one or more towed vehicle units, adjusting the motion of the first vehicle comprises steering the one or more towed units from an expected trajectory of the second vehicle.

A technical benefit may include avoiding a collision between the first vehicle and the second vehicle, or mitigating effects thereof. This is since the collision may be avoided or at least an impact thereof may be reduced if steered away from the expected trajectory of the second vehicle.

Optionally in some examples, including in at least one preferred example, steering the one or more towed vehicle units from the expected trajectory of the second vehicle may comprise steering a rearmost vehicle unit of the one or more towed vehicle units from the expected trajectory of the second vehicle.

A technical benefit may include avoiding a collision between the first vehicle and the second vehicle, or mitigating effects thereof. This is since the collision may be avoided or at least an impact thereof may be reduced if steered away from the expected trajectory of the second vehicle. In particular, the second vehicle is expected to collide with the rearmost vehicle unit, and therefore steering said vehicle unit is most important to mitigate or avoid collisions.

Optionally in some examples, including in at least one preferred example, the sensor data further comprises sensor data used for estimating a speed and mass of the second vehicle. In these examples, actuating the one or more exterior airbags of the first vehicle may comprise, based on the sensor data, actuating the one or more airbags such that a collision between the second vehicle and the one or more airbags is limited to a maximum impact force.

A technical benefit may include avoiding a collision between the first vehicle and the second vehicle, or mitigating effects thereof. This is since actuating the airbags limited to the maximum impact will ensure that an impact of the collision is reduced while also ensuring that the airbags do not inflict any unnecessary impact which can harm passengers of the second vehicle.

Optionally in some examples, including in at least one preferred example, the processing circuitry is configured to: when the estimated risk of collision between the first vehicle and the second vehicle is within a second predefined interval, trigger an alert to be indicated from the first vehicle to the second vehicle, the alert indicating a risk of an expected collision between the first vehicle and the second vehicle. In these examples, the second predefined interval at least partially is associated with a lower risk of collision between the first vehicle and the second vehicle as compared to the first interval.

A technical benefit may include avoiding a collision between the first vehicle and the second vehicle, or mitigating effects thereof. This is since the collision may be avoided or mitigated if the driver of the second vehicle is warned in advance such that the driver can perform any suitable evasive maneuver.

Optionally in some examples, including in at least one preferred example, the sensor data further comprises a motion of the first vehicle. In some of these examples, the processing circuitry is configured to, based on the sensor data, predict a future vehicle motion of the first vehicle. In some of these examples, the processing circuitry is configured to estimate the risk of collision and/or trigger the safety action based on the predicted future vehicle motion of the first vehicle.

A technical benefit may include avoiding a collision between the first vehicle and the second vehicle, or mitigating effects thereof. This is since collision may be mitigated or avoided more efficiently when accounting for the predicted motion of the first vehicle.

Optionally in some examples, including in at least one preferred example, the processing circuitry is configured to, based on the sensor data, predict a future vehicle motion of the second vehicle. In these examples, the processing circuitry is configured to estimate the risk of collision and/or trigger the safety action based on the predicted future vehicle motion of the second vehicle.

A technical benefit may include avoiding a collision between the first vehicle and the second vehicle, or mitigating effects thereof. This is since collision may be mitigated or avoided more efficiently when accounting for the predicted motion of the second vehicle.

According to a second aspect, a first vehicle arranged to travel in a longitudinal travel direction on a road is provided. The first vehicle comprises and/or is configured to be controlled by the computer system according to the first aspect.

Benefits and/or examples of the first aspect apply to the second aspect in a corresponding manner.

Optionally in some examples, including in at least one preferred example, the first vehicle comprises a towing unit and one or more towed vehicle units.

According to a third aspect, a computer-implemented method for handling a first vehicle is provided. The first vehicle is travelling in a longitudinal travel direction on a road. The method comprises, by processing circuitry of a computer system, obtaining from a set of sensors mounted on the first vehicle, sensor data indicative of a motion of a second vehicle travelling the road. The second vehicle is travelling towards the first vehicle in the longitudinal travel direction. The method comprises, by the processing circuitry, based on the sensor data, estimating a risk of collision between the first vehicle and the second vehicle.

The method comprises, by the processing circuitry, when the estimated risk of collision between the first vehicle and the second vehicle is within a first predefined interval, triggering a safety action to be performed by the first vehicle based on the motion of the second vehicle.

The safety action comprises adjusting a motion of the first vehicle, and/or actuating one or more exterior airbags of the first vehicle.

Benefits and/or examples of the first aspect apply to the third aspect in a corresponding manner.

Optionally in some examples, including in at least one preferred example, the sensor data further comprises a motion of the first vehicle. In these examples, the method may further comprise: by the processing circuitry and based on the sensor data, predicting a future vehicle motion of the first vehicle, and wherein estimating the risk of collision and/or triggering the safety action is based on the predicted future vehicle motion of the first vehicle.

Optionally in some examples, including in at least one preferred example, the method further comprises: by the processing circuitry and based on the sensor data, predicting a future vehicle motion of the second vehicle, and wherein estimating the risk of collision and/or triggering the safety action is based on the predicted future vehicle motion of the second vehicle.

Optionally in some examples, including in at least one preferred example, the method comprises: when the estimated risk of collision between the first vehicle and the second vehicle is within a second predefined interval, triggering an alert to be indicated from the first vehicle to the second vehicle, the alert indicating a risk of an expected collision between the first vehicle and the second vehicle. In these examples, the second predefined interval at least partially is associated with a lower risk of collision between the first vehicle and the second vehicle as compared to the first interval.

Optionally in some examples, including in at least one preferred example, adjusting the motion of the first vehicle comprises adjusting lateral and/or longitudinal speed and/or acceleration of the first vehicle.

The disclosed aspects, examples (including any preferred examples), and/or accompanying claims may be suitably combined with each other as would be apparent to anyone of ordinary skill in the art. Additional features and advantages are disclosed in the following description, claims, and drawings, and in part will be readily apparent therefrom to those skilled in the art or recognized by practicing the disclosure as described herein.

There are also disclosed herein computer systems, control units, code modules, computer-implemented methods, computer readable media, and computer program products associated with the above discussed technical benefits.

BRIEF DESCRIPTION OF THE DRAWINGS

Examples are described in more detail below with reference to the appended drawings.

DETAILED DESCRIPTION

The detailed description set forth below provides information and examples of the disclosed technology with sufficient detail to enable those skilled in the art to practice the disclosure.

To avoid or mitigate effects of collisions, in particular rear-end collisions examples herein may relate to use a sensor, e.g., a reverse-facing camera, mounted on a first vehicle for estimating a risk of a rear-end collision with a following second vehicle. When the risk is deemed high, the first vehicle may steer away, change lane, apply a yaw moment, accelerate, actuate airbags in the rear of the first vehicle, or a combination thereof. These actions may avoid or mitigate effects of a potential rear-end collision.

Figure 1:
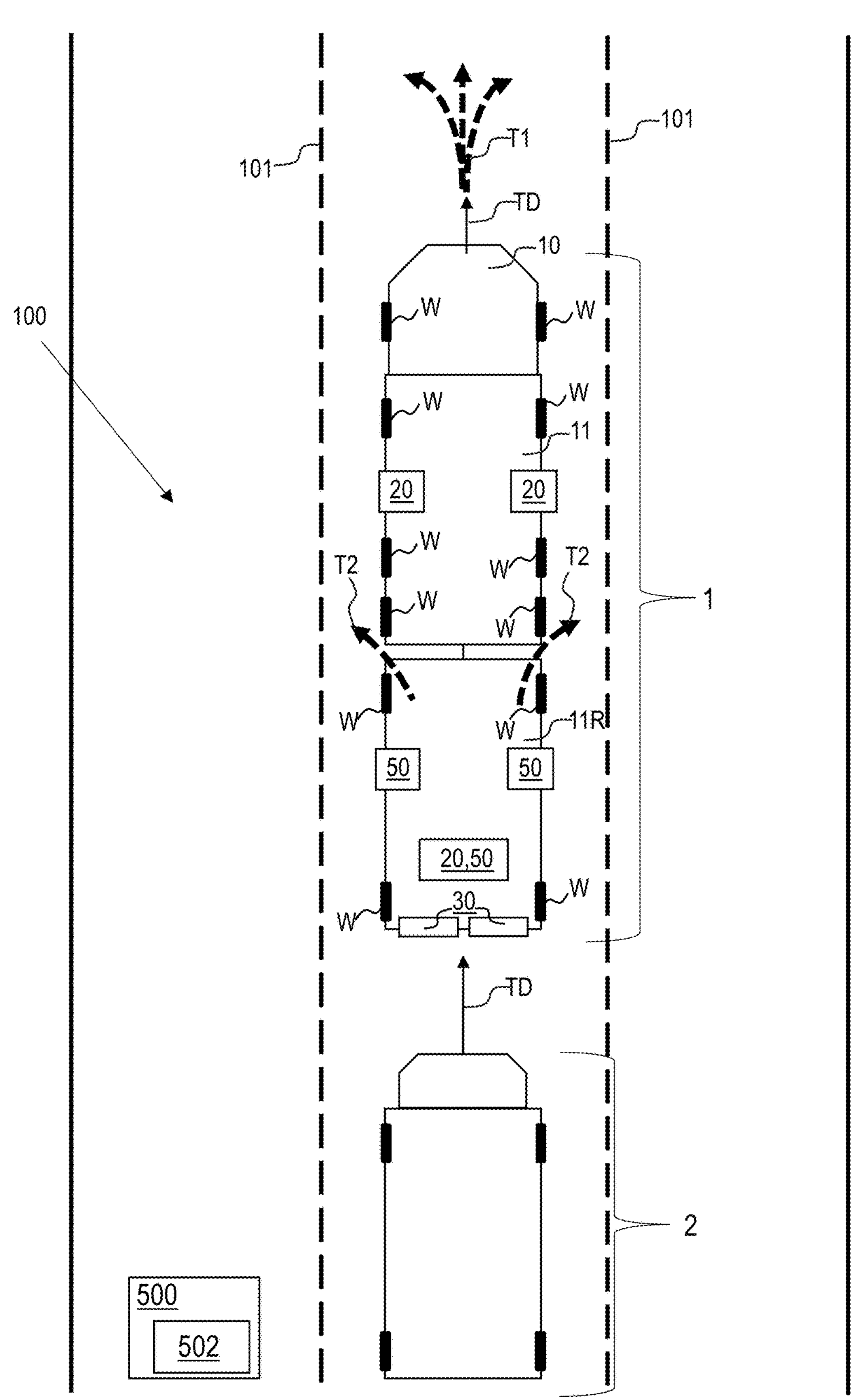
FIG. 1 is an example scenario according to an example.

FIG. 1 illustrates a first vehicle 1 and a second vehicle 2 travelling on a road 100.

The first vehicle 1 and the second vehicle 2 is travelling in a longitudinal travel direction TD on the road 100. The second vehicle 2 is also travelling in the longitudinal travel direction TD on the road 100. In other words, the first vehicle 1 and the second vehicle 2 may be driving in the same direction. The second vehicle 2 may be considered to follow the first vehicle 1. Accordingly, the second vehicle 2 may be approaching the first vehicle 1 from a rear direction, at least when the speed of the second vehicle 2 is higher than the speed of the first vehicle 1.

As illustrated in FIG. 1, for some non-limiting examples, the first vehicle 1 may comprise a towing unit 10, e.g., a tractor, and one or more towed vehicle units 11, 11R, including a rearmost towed vehicle unit 11R, which is arranged closest to the second vehicle 2 with respect to the longitudinal travel direction TD. However, while FIG. 1 illustrates the first vehicle 1 as a vehicle combination comprising the towing unit 10, with the one or more towed vehicle units 11, 11R, the first vehicle 1 may also be any suitable vehicle such as a truck, bus, car, or heavy-duty vehicle.

The one or more towed vehicle units 11, 11R, may comprise any suitable towed vehicle units, e.g., trailers, dollies, or combinations thereof.

The road 100 may be wide, e.g., comprise multiple lanes separated by lane markers 101. In other words, there may be space in the road 100 in a lateral direction such that the first vehicle 1 may have room to maneuver laterally.

The first vehicle 1 may comprise a set of sensors 20. The set of sensors 20 may be mounted on the first vehicle 1, e.g., on the side part and/or on a rear part of the first vehicle 1. The set of sensors 20 may comprise one or more sensors directed in a reverse direction of the longitudinal travel direction TD. In other words, the set of sensors 20 may comprise one or more sensors directed towards the second vehicle 2. The set of sensors 20 may comprise one or more sensors arranged for measuring and/or tracking a motion and/or position of the second vehicle 2. The motion of the second vehicle 2 may be absolute or may be relative to the first vehicle 1. The set of sensors 20 may further comprise any suitable one or more sensors for measuring a position and/or motion of the first vehicle 1.

As an example, the set of sensors 20 may comprise a rear-facing camera, a rear-facing Light Detection and Ranging (Lidar) sensor, a rear-facing Radio Detection and Ranging (Radar) sensor, or a combination thereof.

The first vehicle 1 may comprise one or more exterior airbags 30 of the first vehicle 1. In examples herein, when the first vehicle 1 and the second vehicle 2 is at risk of collision, the first vehicle 1 may actuate, i.e., expand, the one or more exterior airbags 30 such as to minimize an impact of the collision.

The first vehicle 1 may comprise a set of wheels W. The set of wheels W may be independently controllable, e.g., by individual motion support devices such as electrical motors or brakes. The set of wheels W may in some examples herein, e.g., when there is a risk of collision between the first vehicle 1 and the second vehicle 2, it may be possible to apply torque vectoring such that different wheels W are applied different torque causing the first vehicle 1 to be steered laterally and/or to be applied a yaw moment to avoid or reduce effects of the collision.

In examples herein, when there is a risk of collision between the first vehicle 1 and the second vehicle 2, the first vehicle 1 may be steered laterally, applied a yaw moment, accelerated in the longitudinal direction to avoid or mitigate effects of the collision, or a combination thereof e.g., as indicated by a trajectory T1 arranged to cause the first vehicle 1 to avoid the second vehicle 2 or to reduce an impact of a potential collision with the second vehicle 2. The steering, yaw moment or other motion control may further be applied individually to any vehicle unit as part of the first vehicle 1, in particular the rearmost vehicle unit 11R, as indicated by a trajectory T2 arranged to steer the rearmost vehicle unit 11R such as to avoid the second vehicle 2 or reduce impact of a potential collision with the second vehicle 2.

The first vehicle 1 may further comprise one or more alerting units 50, e.g., displays, lights, and/or speakers, which may be arranged in any suitable location of the first vehicle 1, e.g., on the rear, on the side, or arranged with sensors in the set of sensors 20. The one or more alerting units 50 may be configured to indicate to the second vehicle 2 when there is a risk of collision between the first vehicle 1 and the second vehicle 2. The one or more alerting units 50 may further be configured to indicate when there is a risk for the second vehicle 2 to overtake the first vehicle 1.

Examples herein may performed by a computer system 500 and/or a processing circuitry 502 therein.

In other words, the first vehicle 1 may comprise and/or may be configured to be controlled by the computer system 500.

The computer system 500 and/or the processing circuitry 502 may be comprised in the first vehicle 1 or may be comprised in a remote location, such as in a server or as part of a cloud service.

The computer system 500 and/or the processing circuitry 502 may be able to control and/or communicate with any suitable entities of the first vehicle 1, e.g., the computer system 500 and/or the processing circuitry 502 may as non-limiting examples, be capable of:

- Obtaining sensor data of the set of sensors 20,
- Actuating the one or more exterior airbags 30,
- Controlling a motion of the first vehicle 1 and if applicable, its vehicle units, e.g., steering and/or speed/acceleration,
- Triggering alerts on the one or more alerting units 50, or
- A combination thereof.

The computer system 500 and/or the processing circuitry 502 may be an Electronic Control Unit (ECU), e.g., comprised in the first vehicle 1.

Figure 2:
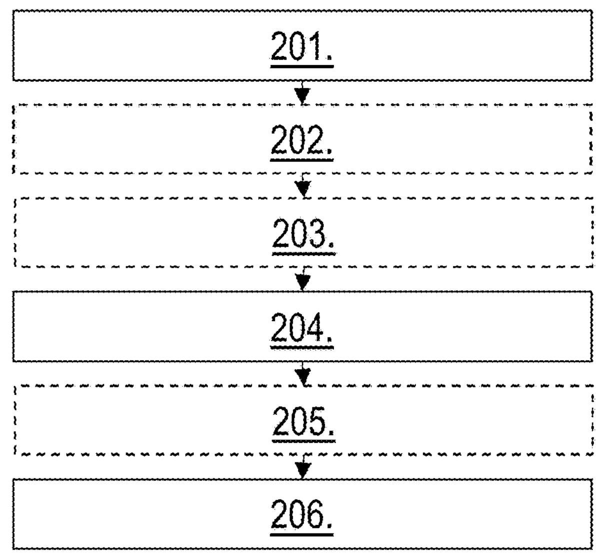
FIG. 2 is a flow chart of an exemplary method according to an example.

FIG. 2 is a flow chart of an exemplary computer-implemented method for handling the first vehicle 1. The first vehicle 1 is travelling in the longitudinal travel direction TD on the road 100. The method comprises any one or more of the following actions. The actions may be taken in any suitable order. Optional actions may be indicated with dashed boxes in FIG. 2. The method may be performed by the computer system 500 and/or the processing circuitry 502, i.e., the computer system 500 and/or the processing circuitry 502 may be configured to perform the method according to any one or more of the following actions.

Action 201

The method comprises obtaining sensor data indicative of a motion of a second vehicle 2 travelling the road 100. The second vehicle 2 is travelling towards the first vehicle 1 in the longitudinal travel direction TD.

The sensor data is obtained from, i.e., received from, the set of sensors 20 mounted on the first vehicle 1.

The sensor data may be any suitable sensor data, e.g., video, Lidar sensor data, Radar sensor data, etc.

In some examples, the sensor data further comprises sensor data used for estimating a speed and mass of the second vehicle 2.

The sensor data may further comprise or indicate any one or more out of:

- A longitudinal velocity of the second vehicle 2,
- A distance between the first vehicle 1 and the second vehicle 2,
- A pitch angle and/or a steering angle of the second vehicle 2,
- a braking or acceleration maneuver, and
- an image of the second vehicle 2.

In examples herein, the braking or acceleration maneuver may be estimated using the pitch angle and/or steering angle of the second vehicle 2 and may be used in conjunction with the sensor data for any suitable example herein.

In examples herein, the image of the second vehicle 2 may be used to identify characteristics of the vehicle 2, e.g., by mapping to a database or by using a machine learning model. The characteristics of the second vehicle 2 may comprise, vehicle type e.g., passenger car, light truck, large truck, bus, motorcycle, etc. The characteristics of the second vehicle 2 may comprise size or dimensions of the second vehicle 2. The characteristics of the second vehicle 2 may comprise mass of the second vehicle 2. The characteristics of the second vehicle 2 may comprise capabilities, e.g., steering or braking capabilities, of the second vehicle 2. The characteristics of the vehicle 2 may be used as a basis, e.g., in conjunction with the sensor data, for any suitable example herein.

Action 202

In some examples, the sensor data further comprises a motion of the first vehicle 1. In some of these examples, the method comprises, based on the sensor data, predicting a future vehicle motion of the first vehicle 1, e.g., comprising any of speed, acceleration, position, steering, yaw motion, trajectory, or a combination thereof.

Action 203

In some examples, the method comprises, based on the sensor data, predicting a future vehicle motion of the second vehicle 2, e.g., comprising any of speed, acceleration, position, steering, yaw motion, trajectory, or a combination thereof.

Action 204

The method comprises, based on the sensor data, estimating a risk of collision between the first vehicle 1 and the second vehicle 2. The risk of collision may be estimated in any suitable manner based on the sensor data. For example, speed difference and/or proximity between the first vehicle 1 and the second vehicle 2 may be used to estimate the risk of collision.

In some examples, estimating the risk of collision is based on the predicted future vehicle motion of the first vehicle 1 and/or the second vehicle 2, e.g., as predicted in actions 202-203.

In some examples, estimating the risk of collision comprises establishing one or more risk metrics of the second vehicle 2 based on the sensor data, e.g., with respect to the motion and/or position of the second vehicle 2 and/or the first vehicle 1.

In some examples, the one or more risk metrics may be determined based and/or may comprise on any one or more out of:

- a speed or acceleration of the second vehicle 2,
- a brake threat number (BTN) parameter indicative of a ratio between longitudinal motion of the first vehicle 1 and the second vehicle 2 needed to avoid a collision, and/or the BTN may be a number of brakes performed by the first vehicle 1 and/or the second vehicle 2 within a time period, e.g., in relation to a longitudinal motion of the first vehicle 1 and/or the second vehicle 2,
- a steer threat number (STN) parameter indicative of a ratio between lateral motion of the first vehicle 1 and the second vehicle 2 needed to avoid a collision, and/or the STN may be a number of lateral shifts of the second vehicle 2, e.g., in relation to a lateral motion of the first vehicle 1 and/or the second vehicle 2,
- a time to brake (TTB) parameter indicative of a time the second vehicle 2 has to brake before colliding with the first vehicle,
- a time to steer (TTS) parameter indicative of a time the second vehicle 2 has to steer away from the first vehicle before colliding with the first vehicle.

Any one or more out of the BTN, STN, TTB, TTS, parameters may be established based on the obtained sensors data and optionally with respect to a predefined model.

The risk of collision may indicate that the first vehicle 1 and the second vehicle 2 will collide if the one or more risk metrics meets a predefined collision criteria, e.g., based on any suitable heuristics such as if any or multiple of the risk metrics is above a threshold.

While some examples of estimating the risk of collision is mentioned above, any other suitable estimation may also apply to examples herein.

Action 205

In some examples, the method comprises, when the estimated risk of collision between the first vehicle 1 and the second vehicle 2 is within a second predefined interval, triggering an alert to be indicated from the first vehicle 1 to the second vehicle 2, e.g., by the one or more alerting units 50. The alert indicates a risk of an expected collision between the first vehicle 1 and the second vehicle 2. The alert may be exterior of the first vehicle 1.

Within the second predefined interval may mean above or below a second threshold or may also mean to fulfil a second criteria.

The alert may be indicated by the one or more alerting units 50, e.g., as lights, sounds, predefined warning colors, warning texts on displays, etc.

In some examples, the set of sensors 20 may further indicate a traffic situation on the side of the first vehicle and/or in front of the first vehicle 1 along the longitudinal travel direction TD. In some of these examples, the method may comprises evaluating a risk for the second vehicle 2 to overtake the first vehicle 1, e.g., due to collision with other vehicles while overtaking the first vehicle 1. In these examples, the alert may further indicate that overtaking is dangerous and should be avoided. Evaluating a risk for the second vehicle 2 to overtake the first vehicle 1 may consider the length of the first vehicle 1 and/or the characteristics of the road 100.

Action 206

The method comprises, when the estimated risk of collision between the first vehicle 1 and the second vehicle 2 is within a first predefined interval, triggering a safety action to be performed by the first vehicle 1.

Within the first predefined interval may mean above or below a first threshold or may also mean to fulfil a first criteria.

With regards to action 205, the second predefined interval at least partially is associated with a lower risk of collision between the first vehicle 1 and the second vehicle 2 as compared to the first interval. I.e., the triggering of the safety action may be performed subsequent to triggering the alert as in action 205.

Triggering the safety action is based on the motion of the second vehicle 2. The safety action may be determined and/or selected based on the expected and/or the predicted motion of the first vehicle 1 and/or the second vehicle 2, e.g., based on if, when, how, and/or where a collision may occur.

Triggering the safety action is based on the motion of the second vehicle 2 may be determined and/or selected with respect to a predefined safety model, and depending on the estimated risk, and/or expected or predicted vehicle motions of the first vehicle 1 and the second vehicle 2, the safety action may apply accordingly to best avoid collision or best reduce collision impact.

In other words, triggering the safety action may be based on the predicted future vehicle motion of the first vehicle 1, e.g., as predicted in action 202 and/or based on the predicted future vehicle motion of the second vehicle 2, e.g., as predicted in action 203.

The safety action comprises adjusting a motion of the first vehicle 1 and/or actuating one or more exterior airbags 30 of the first vehicle 1.

In some examples, adjusting the motion of the first vehicle 1 comprises adjusting lateral and/or longitudinal speed and/or acceleration of the first vehicle 1. In other words, the first vehicle 1 may speed away from the second vehicle 2, thereby avoiding the collision or reducing impact.

In some examples, adjusting the motion of the first vehicle 1 comprises triggering a yaw moment to be applied to the first vehicle 1.

In other words, the first vehicle 1 may turn and travel away from an expected trajectory of the second vehicle 2, thereby avoiding the collision or reducing impact.

In some examples, triggering the yaw moment to be applied to the first vehicle 1 comprises triggering different torque to be applied to different wheels W of the first vehicle 1.

In this way, the first vehicle 1 may turn and travel away from an expected trajectory of the second vehicle 2 by only controlling torque on some wheels, thereby not involving any steering wheel or steering of all vehicle units of the first vehicle 1.

In some examples, when the first vehicle 1 comprises one or more towed vehicle units 11, 11R, triggering the yaw moment to be applied to the first vehicle 1 comprises triggering a yaw moment to be applied to a rearmost vehicle unit 11R of the one or more towed vehicle units 11, 11R. This means that the rearmost vehicle unit 11R is turned to travel away from an expected motion of the second vehicle 2 to avoid or reduce impact of the collision.

In other words, when the first vehicle 1 comprises one or more towed vehicle units 11, 11R, adjusting the motion of the first vehicle 1 may comprise steering the one or more towed units away from an expected trajectory of the second vehicle 2. Preferably, steering the one or more towed vehicle units 11, 11R from the expected trajectory of the second vehicle 2 comprises steering a rearmost vehicle unit 11R of the one or more towed vehicle units 11, 11R from the expected trajectory of the second vehicle 2.

Steering the rearmost vehicle unit 11R and/or applying the yaw moment to the rearmost vehicle unit 11R may further comprise steering and/or applying yaw moment to multiple rearmost vehicle units, e.g., the rearmost vehicle unit 11R and the second rearmost vehicle unit.

In some examples, actuating the one or more exterior airbags 30 of the first vehicle 1 comprises, based on the sensor data, actuating the one or more airbags 30 such that a collision between the second vehicle 2 and the one or more airbags 30 is limited to a maximum impact force. The maximum impact force may be limited to 10G or lower, as 10G is typically what a human may survive. This means that an impact may at least be reduced by a force corresponding to 10G or other force if deemed suitable for the current traffic situation. In these examples, the mass and speed of the second vehicle 2 may be estimated based on the sensor data. In particular, mass may be estimated by mapping image information to vehicle characteristics data comprising the mass such as by identifying a vehicle type or model and mapping the type or model to a mass estimation. Additionally or alternatively, estimating the speed of the of the second vehicle 2 may using rear-camera information, and/or information of previous position, speed and/or acceleration data of the second vehicle 2, e.g., as obtained from e.g. radar, LIDAR, or camera system.

Additionally or alternatively, estimating the mass and/or speed of the of the second vehicle 2 may use any suitable sensor. Typically, rear-facing cameras may be the simplest systems for estimating both the mass and speed. Information from Radars, Lidars, or ultrasonic sensors may also be used to track the motion of the second vehicle 2. It may also be possible to use vehicle-to-vehicle communication between the first vehicle 1 and the second vehicle 2, e.g., by using a detector of a vehicle within a Wi-Fi, or other wireless network in the range of vehicle 1 to detect the second vehicle 2.

When cameras are used in example herein, the types of cameras may include rear view mirror cameras as they may always be arranged to record very close to the rear of the first vehicle 1.

Figure 3:
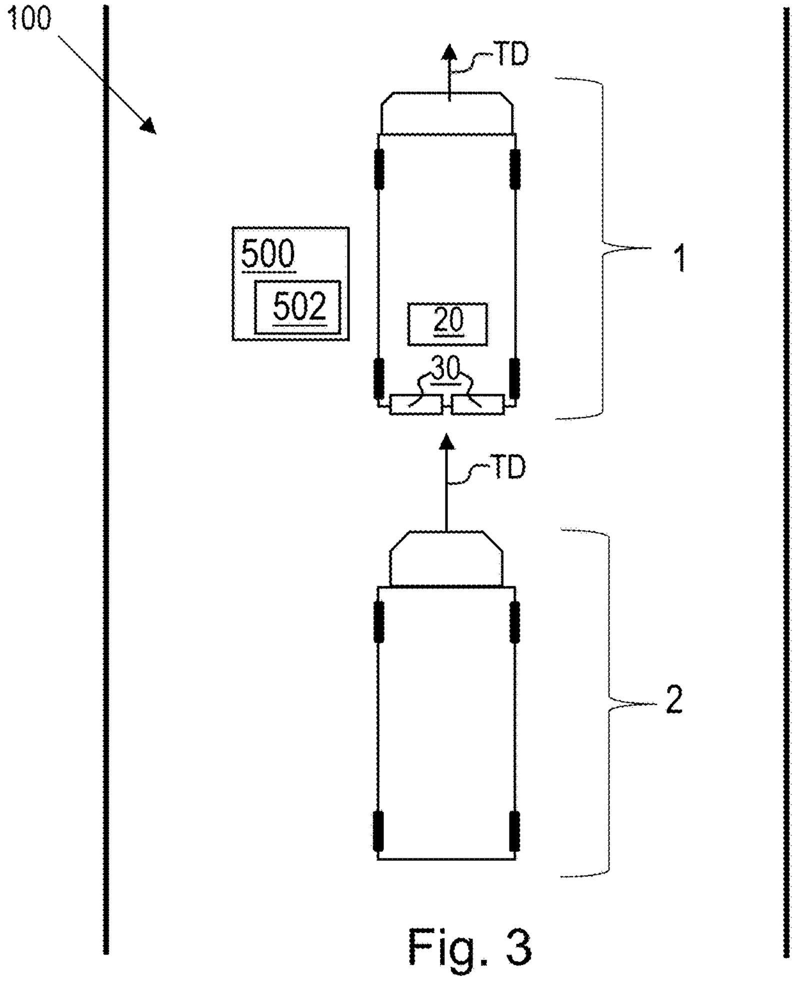
FIG. 3 is another view of FIG. 1, according to an example.

FIG. 3 is another view of FIG. 1, according to an example. The example may be combined with any of the above actions in any suitable manner.

The computer system 500 comprising the processing circuitry 502 configured to handle the first vehicle 1 is provided. The first vehicle 1 is travelling in the longitudinal travel direction TD on the road 100.

The processing circuitry 502 is configured to obtain from a set of sensors 20 mounted on the first vehicle 1. The sensor data is indicative of a motion of a second vehicle 2 travelling the road 100. The second vehicle 2 is travelling towards the first vehicle 1 in the longitudinal travel direction TD.

The processing circuitry 502 is configured to, based on the sensor data, estimate a risk of collision between the first vehicle 1 and the second vehicle 2.

The processing circuitry 502 is configured to, when the estimated risk of collision between the first vehicle 1 and the second vehicle 2 is within a first predefined interval, trigger a safety action to be performed by the first vehicle 1 based on the motion of the second vehicle 2.

The safety action comprises any one or both out of:

adjusting a motion of the first vehicle 1, actuating one or more exterior airbags 30 of the first vehicle 1.

Figure 4:
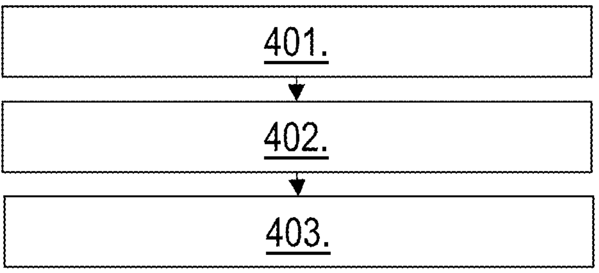
FIG. 4 is a flow chart of an exemplary method according to an example.

FIG. 4 is a flow chart of an exemplary method according to an example. The below actions may be taken in any suitable order and may be combined with any of the above actions in any suitable manner.

A computer-implemented method for handling the first vehicle 1 is provided. The first vehicle 1 is travelling in the longitudinal travel direction TD along the road 100.

Action 401

The method comprises, by the processing circuitry 502 of the computer system 500, obtaining from a set of sensors 20 mounted on the first vehicle 1, sensor data indicative of a motion of a second vehicle 2 travelling the road 100. The second vehicle 2 is travelling towards the first vehicle 1 in the longitudinal travel direction TD.

Action 402

The method comprises, by the processing circuitry 502, based on the sensor data, estimating a risk of collision between the first vehicle 1 and the second vehicle 2.

Action 403

The method comprises, by the processing circuitry 502, when the estimated risk of collision between the first vehicle 1 and the second vehicle 2 is within a first predefined interval, triggering a safety action to be performed by the first vehicle 1 based on the motion of the second vehicle 2.

The safety action comprises any one or both out of:

adjusting a motion of the first vehicle 1, actuating one or more exterior airbags 30 of the first vehicle 1.

Further Variations and Examples

Examples herein may relate to a rear-end Collision Avoidance System (CAS).

In examples herein, a plurality of signals may be estimated from reverse camera/s or radar/s or lidar/s, e.g., the set of sensors 20, of the rearmost vehicle unit 11R such as using an image recognition and perception computing located either any vehicle unit 10, 11, 11R. When part of the rearmost vehicle unit 11R, sensor data, e.g., camera data, may be sent to the computer system 500 in another vehicle unit of the first vehicle 1 using high-speed ethernet communication.

In examples herein one or more risk metrics of collision between the first and second vehicles 1, 2 may be calculated, e.g., as in action 204. If a risk metric or set of risk metrics is greater than a third threshold, a warning system for drivers of the first vehicle 1 and the second vehicle 2 is activated, e.g., as part of the alert and/or alerting units as discussed in action 205. The warning system may comprise hyper flashing hazard rear warning lamps or the brake lights of the rearmost vehicle unit 11R, e.g., if allowed by local legislation.

If a risk metric is greater than a fourth threshold, a mitigation/avoidance control action is activated, e.g., as in action 206, which may comprise at least one of the following actions:

- Communication to an Advances Driver Assistance System (ADAS) of the first vehicle 1, e.g., as part of the computer system 500, with desired control actions, e.g., desired vehicle acceleration or steering, for collision avoidance or collision mitigation, which actions are to be verified to be safe by the ADAS.
- Avoidance and/or mitigation by acceleration of the first vehicle 1 which may involve a positive acceleration of the first vehicle 1 to decrease a relative longitudinal velocity and acceleration to the second vehicle 2.
- Avoidance and/or mitigation by steering which may involve steering the first vehicle 1 in an opposite direction of a detected steering and/or direction of the second vehicle 2,
- Avoidance and/or mitigation by torque vectoring the rearmost vehicle unit 11R, such as to create a yaw moment by braking or propulsion of different wheels W, or by a steered axle in the rearmost vehicle unit 11R if available. The yaw moment may rotate the rearmost vehicle unit 11R, and thereby helping the second vehicle 2 in the steering maneuver. For long combination vehicles this action could be simpler and more reliable due to the delay between the lateral motion between vehicle units, and potential oscillations.
- Activation of the one or more exterior airbags 30, if a predicted impact with more than to-be-defined percentage of frontal area of the second vehicle 2 is above a threshold.

Figure 5:
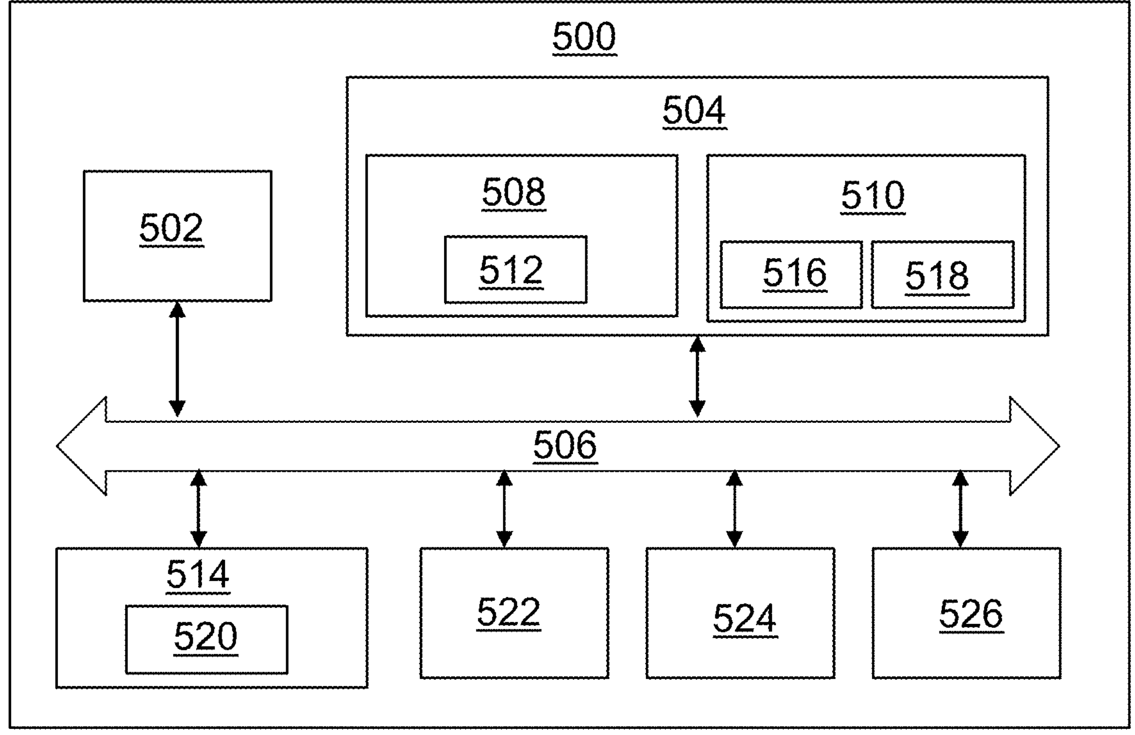
FIG. 5 is a schematic diagram of an exemplary computer system for implementing examples disclosed herein, according to an example.

FIG. 5 is a schematic diagram of a computer system 500 for implementing examples disclosed herein. The computer system 500 is adapted to execute instructions from a computer-readable medium to perform these and/or any of the functions or processing described herein. The computer system 500 may be connected (e.g., networked) to other machines in a LAN (Local Area Network), LIN (Local Interconnect Network), automotive network communication protocol (e.g., FlexRay), an intranet, an extranet, or the Internet. While only a single device is illustrated, the computer system 500 may include any collection of devices that individually or jointly execute a set (or multiple sets) of instructions to perform any one or more of the methodologies discussed herein. Accordingly, any reference in the disclosure and/or claims to a computer system, computing system, computer device, computing device, control system, control unit, electronic control unit (ECU), processor device, processing circuitry, etc., includes reference to one or more such devices to individually or jointly execute a set (or multiple sets) of instructions to perform any one or more of the methodologies discussed herein. For example, control system may include a single control unit or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, etc.

The computer system 500 may comprise at least one computing device or electronic device capable of including firmware, hardware, and/or executing software instructions to implement the functionality described herein. The computer system 500 may include processing circuitry 502 (e.g., processing circuitry including one or more processor devices or control units), a memory 504, and a system bus 506. The computer system 500 may include at least one computing device having the processing circuitry 502. The system bus 506 provides an interface for system components including, but not limited to, the memory 504 and the processing circuitry 502. The processing circuitry 502 may include any number of hardware components for conducting data or signal processing or for executing computer code stored in memory 504. The processing circuitry 502 may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processing circuitry 502 may further include computer executable code that controls operation of the programmable device.

The system bus 506 may be any of several types of bus structures that may further interconnect to a memory bus (with or without a memory controller), a peripheral bus, and/or a local bus using any of a variety of bus architectures. The memory 504 may be one or more devices for storing data and/or computer code for completing or facilitating methods described herein. The memory 504 may include database components, object code components, script components, or other types of information structure for supporting the various activities herein. Any distributed or local memory device may be utilized with the systems and methods of this description. The memory 504 may be communicably connected to the processing circuitry 502 (e.g., via a circuit or any other wired, wireless, or network connection) and may include computer code for executing one or more processes described herein. The memory 504 may include non-volatile memory 508 (e.g., read-only memory (ROM), erasable programmable read-only memory (EPROM), electrically erasable programmable read-only memory (EEPROM), etc.), and volatile memory 510 (e.g., random-access memory (RAM)), or any other medium which can be used to carry or store desired program code in the form of machine-executable instructions or data structures and which can be accessed by a computer or other machine with processing circuitry 502. A basic input/output system (BIOS) 512 may be stored in the non-volatile memory 508 and can include the basic routines that help to transfer information between elements within the computer system 500.

The computer system 500 may further include or be coupled to a non-transitory computer-readable storage medium such as the storage device 514, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 514 and other drives associated with computer-readable media and computer-usable media may provide non-volatile storage of data, data structures, computer-executable instructions, and the like.

Computer-code which is hard or soft coded may be provided in the form of one or more modules. The module(s) can be implemented as software and/or hard-coded in circuitry to implement the functionality described herein in whole or in part. The modules may be stored in the storage device 514 and/or in the volatile memory 510, which may include an operating system 516 and/or one or more program modules 518. All or a portion of the examples disclosed herein may be implemented as a computer program 520 stored on a transitory or non-transitory computer-usable or computer-readable storage medium (e.g., single medium or multiple media), such as the storage device 514, which includes complex programming instructions (e.g., complex computer-readable program code) to cause the processing circuitry 502 to carry out actions described herein. Thus, the computer-readable program code of the computer program 520 can comprise software instructions for implementing the functionality of the examples described herein when executed by the processing circuitry 502. In some examples, the storage device 514 may be a computer program product (e.g., readable storage medium) storing the computer program 520 thereon, where at least a portion of a computer program 520 may be loadable (e.g., into a processor) for implementing the functionality of the examples described herein when executed by the processing circuitry 502. The processing circuitry 502 may serve as a controller or control system for the computer system 500 that is to implement the functionality described herein.

The computer system 500 may include an input device interface 522 configured to receive input and selections to be communicated to the computer system 500 when executing instructions, such as from a keyboard, mouse, touch-sensitive surface, etc. Such input devices may be connected to the processing circuitry 502 through the input device interface 522 coupled to the system bus 506 but can be connected through other interfaces, such as a parallel port, an Institute of Electrical and Electronic Engineers (IEEE) 1394 serial port, a Universal Serial Bus (USB) port, an IR interface, and the like. The computer system 500 may include an output device interface 524 configured to forward output, such as to a display, a video display unit (e.g., a liquid crystal display (LCD) or a cathode ray tube (CRT)). The computer system 500 may include a communications interface 526 suitable for communicating with a network as appropriate or desired.

The operational actions described in any of the exemplary aspects herein are described to provide examples and discussion. The actions may be performed by hardware components, may be embodied in machine-executable instructions to cause a processor to perform the actions, or may be performed by a combination of hardware and software. Although a specific order of method actions may be shown or described, the order of the actions may differ. In addition, two or more actions may be performed concurrently or with partial concurrence.

Examples 1-20 below may disclose various example implementations which can be combined with any of the above examples, actions, or features, in any suitable manner.

Example 1. A computer system 500 comprising processing circuitry 502 configured to handle a first vehicle 1, wherein the first vehicle 1 is travelling in a longitudinal travel direction TD on a road 100, the processing circuitry 502 is configured to:

obtain from a set of sensors 20 mounted on the first vehicle 1, sensor data indicative of a motion of a second vehicle 2 travelling the road 100, wherein the second vehicle 2 is travelling towards the first vehicle 1 in the longitudinal travel direction TD, based on the sensor data, estimate a risk of collision between the first vehicle 1 and the second vehicle 2, and when the estimated risk of collision between the first vehicle 1 and the second vehicle 2 is within a first predefined interval, trigger a safety action to be performed by the first vehicle 1 based on the motion of the second vehicle 2, the safety action comprising any one or both out of:

adjusting a motion of the first vehicle 1, actuating one or more exterior airbags 30 of the first vehicle 1.

Example 2. The computer system 500 of Example 1, wherein adjusting the motion of the first vehicle 1 comprises adjusting lateral and/or longitudinal speed and/or acceleration of the first vehicle 1.

Example 3. The computer system 500 of Example 1 or 2, wherein adjusting the motion of the first vehicle 1 comprises triggering a yaw moment to be applied to the first vehicle 1.

Example 4. The computer system 500 of Example 3, wherein triggering the yaw moment to be applied to the first vehicle 1 comprises triggering different torque to be applied to different wheels W of the first vehicle 1.

Example 5. The computer system 500 of Example 3 or 4, wherein when the first vehicle 1 comprises one or more towed vehicle units 11, 11R, triggering the yaw moment to be applied to the first vehicle 1 comprises triggering a yaw moment to be applied to a rearmost vehicle unit 11R of the one or more towed vehicle units 11, 11R.

Example 6. The computer system 500 of any of Examples 1-5, wherein when the first vehicle 1 comprises one or more towed vehicle units 11, 11R, adjusting the motion of the first vehicle 1 comprises steering the one or more towed units from an expected trajectory of the second vehicle 2.

Example 7. The computer system 500 of any of Examples 1-6, wherein steering the one or more towed vehicle units 11, 11R from the expected trajectory of the second vehicle 2 comprises steering a rearmost vehicle unit 11R of the one or more towed vehicle units 11, 11R from the expected trajectory of the second vehicle 2.

Example 8. The computer system 500 of any of Examples 1-7, wherein the sensor data further comprises sensor data used for estimating a speed and mass of the second vehicle 2, and wherein actuating the one or more exterior airbags 30 of the first vehicle 1 comprises, based on the sensor data, actuating the one or more airbags 30 such that a collision between the second vehicle 2 and the one or more airbags 30 is limited to a maximum impact force.

Example 9. The computer system 500 of any of Examples 1-8, and wherein the processing circuitry 502 is configured to: when the estimated risk of collision between the first vehicle 1 and the second vehicle 2 is within a second predefined interval, and wherein the second predefined interval at least partially is associated with a lower risk of collision between the first vehicle 1 and the second vehicle 2 as compared to the first interval, trigger an alert to be indicated from the first vehicle 1 to the second vehicle 2, the alert indicating a risk of an expected collision between the first vehicle 1 and the second vehicle 2.

Example 10. The computer system 500 of any of Examples 1-9, wherein the sensor data further comprises a motion of the first vehicle 1, and wherein the processing circuitry 502 is configured to, based on the sensor data, predict a future vehicle motion of the first vehicle 1, and wherein the processing circuitry 502 is configured to estimate the risk of collision and/or trigger the safety action based on the predicted future vehicle motion of the first vehicle 1.

Example 11. The computer system 500 of any of Examples 1-10, the processing circuitry 502 is configured to, based on the sensor data, predict a future vehicle motion of the second vehicle 2, and wherein the processing circuitry 502 is configured to estimate the risk of collision and/or trigger the safety action based on the predicted future vehicle motion of the second vehicle 2.

Example 12. A first vehicle 1 arranged to travel in a longitudinal travel direction TD on a road 100, the first vehicle 1 comprising and/or is configured to be controlled by the computer system 500 of any of Examples 1-11.

Example 13. The first vehicle 1 according to Example 12 comprising a towing unit and one or more towed vehicle units 11, 11R.

Example 14. A computer-implemented method for handling a first vehicle 1, wherein the first vehicle 1 is travelling in a longitudinal travel direction TD on a road 100, the method comprising:

by processing circuitry 502 of a computer system 500, obtaining 201, 401 from a set of sensors 20 mounted on the first vehicle 1, sensor data indicative of a motion of a second vehicle 2 travelling the road 100, wherein the second vehicle 2 is travelling towards the first vehicle 1 in the longitudinal travel direction TD, by the processing circuitry 502, based on the sensor data, estimating 204, 402 a risk of collision between the first vehicle 1 and the second vehicle 2, and by the processing circuitry 502, when the estimated risk of collision between the first vehicle 1 and the second vehicle 2 is within a first predefined interval, triggering 206, 403 a safety action to be performed by the first vehicle 1 based on the motion of the second vehicle 2, the safety action comprising any one or both out of:

adjusting a motion of the first vehicle 1, actuating one or more exterior airbags 30 of the first vehicle 1.

Example 15. The method of Example 14, wherein the sensor data further comprises a motion of the first vehicle 1, and wherein the method further comprises: by the processing circuitry 502 and based on the sensor data, predicting 202 a future vehicle motion of the first vehicle 1, and wherein estimating 204 the risk of collision and/or triggering 206 the safety action is based on the predicted future vehicle motion of the first vehicle 1.

Example 16. The method of Example 14 or 15, wherein the method further comprises: by the processing circuitry 502 and based on the sensor data, predicting 203 a future vehicle motion of the second vehicle 2, and wherein estimating 204 the risk of collision and/or triggering 206 the safety action is based on the predicted future vehicle motion of the second vehicle 2.

Example 17. The method of any of Examples 14-16, the method comprises: when the estimated risk of collision between the first vehicle 1 and the second vehicle 2 is within a second predefined interval, wherein the second predefined interval at least partially is associated with a lower risk of collision between the first vehicle 1 and the second vehicle 2 as compared to the first interval, triggering 205 an alert to be indicated from the first vehicle 1 to the second vehicle 2, the alert indicating a risk of an expected collision between the first vehicle 1 and the second vehicle 2.

Example 18. The method of any of Examples 14-17, wherein adjusting the motion of the first vehicle 1 comprises adjusting lateral and/or longitudinal speed and/or acceleration of the first vehicle 1.

Example 19. A computer program product comprising program code for performing, when executed by the processing circuitry 502, the method of any of Examples 14-18.

Example 20. A non-transitory computer-readable storage medium comprising instructions, which when executed by the processing circuitry 502, cause the processing circuitry 502 to perform the method of any of Examples 14-18.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

What is claimed is:

1. A computer system comprising processing circuitry configured to handle a first vehicle, wherein the first vehicle is travelling in a longitudinal travel direction on a road, the processing circuitry is configured to:

obtain from a set of sensors mounted on the first vehicle, sensor data indicative of a motion of a second vehicle travelling the road, wherein the second vehicle is travelling towards the first vehicle in the longitudinal travel direction, based on the sensor data, estimate a risk of collision between the first vehicle and the second vehicle, and when the estimated risk of collision between the first vehicle and the second vehicle is within a first predefined interval, trigger a safety action to be performed by the first vehicle based on the motion of the second vehicle, the safety action comprising any one or both out of:

adjusting a motion of the first vehicle, actuating one or more exterior airbags of the first vehicle.

2. The computer system of claim 1, wherein adjusting the motion of the first vehicle comprises adjusting lateral and/or longitudinal speed and/or acceleration of the first vehicle.

3. The computer system of claim 1, wherein adjusting the motion of the first vehicle comprises triggering a yaw moment to be applied to the first vehicle.

4. The computer system of claim 3, wherein triggering the yaw moment to be applied to the first vehicle comprises triggering different torque to be applied to different wheels of the first vehicle.

5. The computer system of claim 3, wherein when the first vehicle comprises one or more towed vehicle units, triggering the yaw moment to be applied to the first vehicle comprises triggering a yaw moment to be applied to a rearmost vehicle unit of the one or more towed vehicle units.

6. The computer system of claim 1, wherein when the first vehicle comprises one or more towed vehicle units, adjusting the motion of the first vehicle comprises steering the one or more towed units from an expected trajectory of the second vehicle.

7. The computer system of claim 1, wherein steering the one or more towed vehicle units from the expected trajectory of the second vehicle comprises steering a rearmost vehicle unit of the one or more towed vehicle units from the expected trajectory of the second vehicle.

8. The computer system of claim 1, wherein the sensor data further comprises sensor data used for estimating a speed and mass of the second vehicle, and wherein actuating the one or more exterior airbags of the first vehicle comprises, based on the sensor data, actuating the one or more airbags such that a collision between the second vehicle and the one or more airbags is limited to a maximum impact force.

9. The computer system of claim 1, and wherein the processing circuitry is configured to:

when the estimated risk of collision between the first vehicle and the second vehicle is within a second predefined interval, and wherein the second predefined interval at least partially is associated with a lower risk of collision between the first vehicle and the second vehicle as compared to the first interval, trigger an alert to be indicated from the first vehicle to the second vehicle, the alert indicating a risk of an expected collision between the first vehicle and the second vehicle.

10. The computer system of claim 1, wherein the sensor data further comprises a motion of the first vehicle, and wherein the processing circuitry is configured to, based on the sensor data, predict a future vehicle motion of the first vehicle, and wherein the processing circuitry is configured to estimate the risk of collision and/or trigger the safety action based on the predicted future vehicle motion of the first vehicle.

11. The computer system of claim 1, the processing circuitry is configured to, based on the sensor data, predict a future vehicle motion of the second vehicle, and wherein the processing circuitry is configured to estimate the risk of collision and/or trigger the safety action based on the predicted future vehicle motion of the second vehicle.

12. A first vehicle arranged to travel in a longitudinal travel direction on a road, the first vehicle comprising and/or is configured to be controlled by the computer system of claim 1, and optionally, wherein the first vehicle comprises a towing unit and one or more towed vehicle units.

13. A computer-implemented method for handling a first vehicle, wherein the first vehicle is travelling in a longitudinal travel direction on a road, the method comprising:

by processing circuitry of a computer system, obtaining from a set of sensors mounted on the first vehicle, sensor data indicative of a motion of a second vehicle travelling the road, wherein the second vehicle is travelling towards the first vehicle in the longitudinal travel direction, by the processing circuitry, based on the sensor data, estimating a risk of collision between the first vehicle and the second vehicle, and by the processing circuitry, when the estimated risk of collision between the first vehicle and the second vehicle is within a first predefined interval, triggering a safety action to be performed by the first vehicle based on the motion of the second vehicle, the safety action comprising any one or both out of:

adjusting a motion of the first vehicle, actuating one or more exterior airbags of the first vehicle.

14. A computer program product comprising program code for performing, when executed by the processing circuitry, the method of claim 13.

15. A non-transitory computer-readable storage medium comprising instructions, which when executed by the processing circuitry, cause the processing circuitry to perform the method of claim 13.

* * * * *